US008224849B2

(12) United States Patent
Li et al.

(10) Patent No.: US 8,224,849 B2
(45) Date of Patent: *Jul. 17, 2012

(54) OBJECT SIMILARITY SEARCH IN HIGH-DIMENSIONAL VECTOR SPACES

(75) Inventors: Ming Jing Li, Beijing (CN); Wei-Ying Ma, Beijing (CN); Zhiwei Li, Beijing (CN); Bin Wang, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,083

(22) Filed: Apr. 21, 2011

(65) Prior Publication Data

US 2011/0194780 A1    Aug. 11, 2011

Related U.S. Application Data

(63) Continuation of application No. 11/737,075, filed on Apr. 18, 2007, now Pat. No. 7,941,442.

(51) Int. Cl.
*G06F 7/00* (2006.01)
*G06F 17/30* (2006.01)
(52) U.S. Cl. ........................................ 707/780; 707/803
(58) Field of Classification Search .................. 707/780, 707/803, 100, 3
See application file for complete search history.

(56) References Cited

U.S. PATENT DOCUMENTS

| 5,968,121 | A | 10/1999 | Logan et al. |
|---|---|---|---|
| 6,226,646 | B1 | 5/2001 | Geurts |
| 6,546,146 | B1 | 4/2003 | Hollinger et al. |
| 6,578,031 | B1 | 6/2003 | Washizawa |
| 6,618,727 | B1 | 9/2003 | Wheeler et al. |
| 6,694,311 | B1 | 2/2004 | Smith |
| 6,834,278 | B2 | 12/2004 | Yu et al. |
| 7,007,019 | B2 | 2/2006 | Kanno |
| 7,020,651 | B2 | 3/2006 | Ripley |
| 7,949,186 | B2 * | 5/2011 | Grauman et al. ............. 382/170 |
| 2002/0029232 | A1 | 3/2002 | Bobrow et al. |
| 2004/0199516 | A1 | 10/2004 | Thames et al. |
| 2004/0249831 | A1 | 12/2004 | Fagin et al. |
| 2005/0044056 | A1 | 2/2005 | Ray et al. |
| 2005/0094870 | A1 | 5/2005 | Furukawa et al. |
| 2006/0224562 | A1 | 10/2006 | Yan et al. |
| 2006/0259462 | A1 | 11/2006 | Timmons |
| 2007/0067724 | A1 | 3/2007 | Takahashi et al. |
| 2008/0010304 | A1 * | 1/2008 | Vempala et al. ............. 707/100 |
| 2008/0235184 | A1 | 9/2008 | Nakamura |

(Continued)

OTHER PUBLICATIONS

Sakurai, Yasushi, et al., "The A-Tree: An Index Structure for High-Dimensional Spaces Using Relative Approximation," Proceedings of the 26th VLDB Conference, Cairo, Egypt 2000 (11 pages).

(Continued)

*Primary Examiner* — Kuen Lu
(74) *Attorney, Agent, or Firm* — Perkins Coie LLP

(57) ABSTRACT

An object search system generates a hierarchical clustering of objects of a collection based on similarity of the objects. The object search system generates a separate hierarchical clustering of objects for multiple features of the objects. To identify objects similar to a target object, the object search system first generates a feature vector for the target object. For each feature of the feature vector, the object search system uses the hierarchical clustering of objects to identify the cluster of objects that is most "feature similar" to that feature of the target object. The object search system indicates the similarity of each candidate object based on the features for which the candidate object is similar.

18 Claims, 11 Drawing Sheets

U.S. PATENT DOCUMENTS

2008/0263042 A1    10/2008    Li et al.

OTHER PUBLICATIONS

Weber, Roger et al., "A Quantitative Analysis and Performance Study for Similarity-Search Methods in High-Dimensional Spaces," Proceedings of the 24th VLDB Conference, New York 1998 (12 pages).

Gionis, Aristides et al., "Similarity Search in High Dimensions via Hashing," Proceedings of the 25th VLDB Conference, Edinburgh, Scotland 1999 (12 pages).

Wang, Bin et al., "Large-Scale Duplicate Detection for Web Image Search," Copyright 2006 IEEE (4 pages).

\* cited by examiner

OBJECT SIMILARITY SEARCH IN HIGH-DIMENSIONAL VECTOR SPACES

This application is a continuation application of U.S. patent application Ser. No. 11/737,075, filed on Apr. 18, 2007, and entitled "OBJECT SIMILARITY SEARCH IN HIGH-DIMENSIONAL VECTOR SPACES" which is incorporated herein in its entirety by reference.

BACKGROUND

Many search engine services, such as Google and Yahoo, provide for searching for information that is accessible via the Internet. These search engine services allow users to search for display pages, such as web pages, that may be of interest to users. After a user submits a search request or query that includes search terms, the search engine service identifies web pages that may be related to those search terms. To quickly identify related web pages, the search engine services may maintain a mapping of keywords to web pages. This mapping may be generated by crawling and indexing the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service then ranks the web pages of the search result based on the closeness of each match, web page popularity (e.g., Google's PageRank), and so on. The search engine service may also generate a relevance score to indicate how relevant the information of the web page may be to the search request. The search engine service then displays to the user links to those web pages in an order that is based on their rankings.

These search engine services may, however, not be particularly useful in certain situations. In particular, it can difficult to formulate a suitable search request that effectively describes the needed information. For example, if a person sees a flower on the side of a road and wants to learn the identity of the flower, the person when returning home may formulate the search request of "picture of yellow tulip-like flower in Europe" (e.g., yellow tulip) in hopes of seeing a picture of the flower. Unfortunately, the search result may identify so many web pages that it may be virtually impossible for the person to locate the correct picture, even assuming that the person can accurately remember the details of the flower. If the person has a mobile device, such as a personal digital assistant ("PDA") or cell phone, the person may be able to submit the search request while at the side of the road. Such mobile devices, however, have limited input and output capabilities, which make it difficult both to enter the search request and to view the search result.

If the person, however, is able to take a picture of the flower, the person may then be able to use a Content Based Image Retrieval ("CBIR") system to find a similar-looking picture. Although the detection of duplicate images can be achieved when the image database of the CBIR system happens to contain a duplicate image, the image database will not contain a duplicate of the picture of the flower at the side of the road. If a duplicate image is not in the database, it can be prohibitively expensive computationally, if even possible, to find a "matching" image. For example, if the image database contains an image of a field of yellow tulips and the picture contains only a single tulip, then the CBIR system may not recognize the images as matching.

Searching for similar images, or more generally objects (e.g., still images, video images, and audio), has many useful applications. One application, as described above, is to find web pages that may relate to the content of an image. A search engine may input a search request that includes text and an image. The search engine may locate web pages that contain textual content that is similar to the text of the search request and an image that is similar to the image of the search request. Another application of finding similar objects is to help enforce intellectual property rights (e.g., copyrights). Such an application can help find pirated versions of pictures, movies, music, and so on. A copyright owner may build a database of copyrighted objects. When a suspect object is found (e.g., on a web page), it can be compared to the objects in the database to determine whether it is similar to a copyrighted object. If so, then a copyright violation may have occurred. If a copyright owner (or enforcer of copyrights on behalf of owners) has millions of copyrighted objects (e.g., a collection of still images or frames of videos), it can be computationally very expensive to search the database.

SUMMARY

A method and system for identifying similar objects using high-dimensional vector spaces is provided. An object search system generates a hierarchical clustering of objects of a collection based on similarity of the objects. The object search system generates a separate hierarchical clustering of objects for multiple features of the objects. Since many features may be used, an object is represented by a feature vector in a high-dimensional space. To identify objects similar to a target object, the object search system first generates a feature vector for the target object. For each feature of the feature vector, the object search system uses the hierarchical clustering of objects to identify the cluster of objects that is most "feature similar" to that feature of the target object. Because many very different objects can be feature similar for a few features, the object search system indicates the similarity of each candidate object based on the features for which the candidate object is similar. The count is an indication of the similarity of the candidate object to the target object. A candidate object with a higher count is more likely to be similar to the target object than a candidate object with a lower count. The object search system may then rank the candidate objects based on their counts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
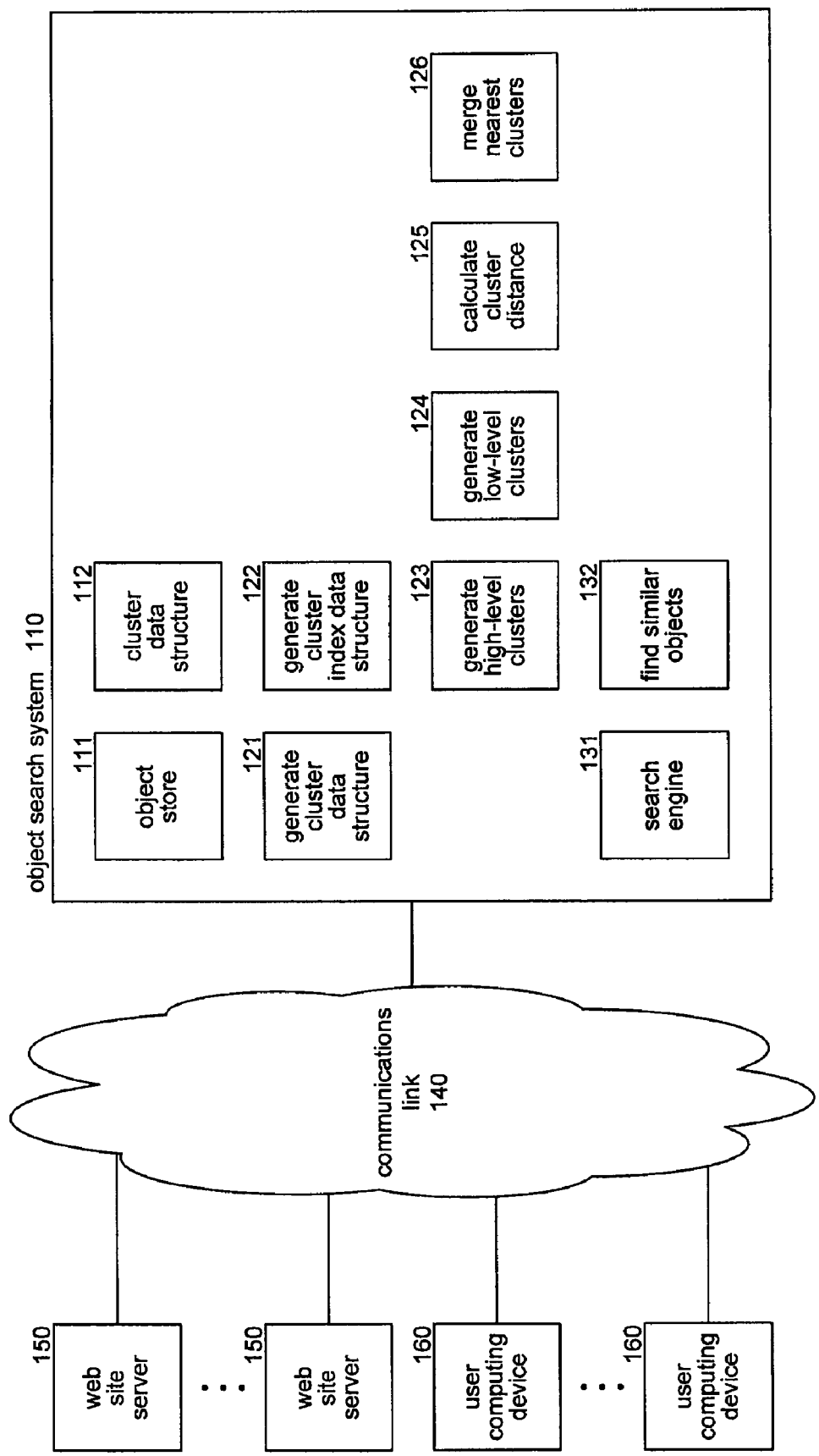
FIG. 1 is a block diagram that illustrates components of an object search system in one embodiment.

A method and system for identifying similar objects using high-dimensional vector spaces is provided. In one embodiment, the objects are images, and an image search system generates a hierarchical clustering of images of a collection based on similarity of the images. For example, the images of the collection may be of still pictures that a copyright owner is willing to license. The image search system generates a separate hierarchical clustering of images for multiple features of the images. The features may include a feature derived from the gray scale of an image, a feature derived from color histogram data of an image, a feature derived from blurness of an image, a feature derived from a region of interest, and so on. Since many features may be used, an image is represented by a feature vector in a high-dimensional space. To identify images similar to a target image, the image search system first generates a feature vector for the target image. For each feature of the feature vector, the image search system uses the hierarchical clustering of images to identify the cluster of images that is most "feature similar" to that feature of the target image. For example, the image search system may identify for the gray scale feature a cluster that contains images A, B, and C and may identify for the color histogram feature a cluster that contains images C, D, and E. The images of the identified cluster are "candidate images" to be considered similar to the target image. Because many very different images can be feature similar for a few features, the image search system indicates the similarity of each candidate image based on the features for which the candidate image is similar. For example, the image search system may for each candidate image generate a count of the number of features for which the candidate image is feature similar to the target image. The count is an indication of the similarity of the candidate image to the target image. A candidate image with a higher count is more likely to be similar to the target image than a candidate image with a lower count. The image search system may then rank the candidate images based on their counts. The highest-ranking candidate images will likely be more similar to the target image than the other candidate images. One skilled in the art will appreciate that each "feature" of a feature vector can be itself a feature vector. For example, the gray scale feature can be represented by a feature vector with elements corresponding to the gray scale of areas of the image at different resolutions. The first element may be a list of average gray scales for blocks of size 4-by-4, the second element may be a list of average gray scales for blocks of size 8-by-8, and so on.

In one embodiment, the image search system may represent each image as a feature vector that has a hash code (e.g., 32 bits) for each feature. The image search system may determine feature similarity based on distance between the hash code of the target image and the hash codes of the images of a cluster. The image search system may use a Hamming distance, which is the number of 1-bits in the exclusive-OR of the hash codes or the number of different bits. For example, the Hamming distance between the hash codes of "10101010" and "10110101" is five because the exclusive-OR of the hash code of "00011111" has five 1-bits. The distance between a cluster and an image is the maximum distance between the images of the cluster and the image. For example, if a cluster contains images A, B, and C with distances of 3, 3, and 2, respectively, to a target object, then the distance of the cluster to the target object is 3.

The image search system generates a hierarchical index of the clusters of images for each feature. The image search system generates a high-level cluster of images and then generates low-level clusters of images within each high-level cluster representing a hierarchical clustering of the images. One skilled in the art will appreciate that the image search system may have more than two levels of clustering depending on the types of objects being clustered, the size of the hash codes, and so on. In some embodiments, the image search system may generate high-level clusters for a feature by clustering images whose hash codes have the same high-order bits. For example, the image search system may have a parameter that indicates the number of high-order bits used in the high-level clustering. The image search system may then generate clusters within each high-level cluster by generating initial low-level clusters and then merging the low-level clusters that are similar until a merging termination criterion is satisfied. A merging termination criterion may be that the number of low-level clusters is less than a fixed threshold number or a variable threshold number based on the number of images in the high-level cluster, and so on. In some embodiments, the image search system may generate an initial low-level cluster for each image or for each group of images whose hash codes are the same. The image search system then repeatedly merges the two low-level clusters that are most similar until the merging termination criterion is satisfied. The image search system may determine similarity between clusters based on the distance between the clusters. The distance between two clusters is the maximum distance between the images of the clusters. For example, the pairs of images of a cluster with images A, B, and C and a cluster with images D and E are A-D, A-E, B-D, B-E, C-D, and C-E with distances of 4, 5, 4, 5, 5, and 5, respectively. In such a case, the distance between the clusters will be 5.

To find images that are similar to a target image, the image search system generates a feature vector for the target image. The feature vector contains a hash code of each feature of the target image. For each feature of the feature vector, the image search system uses the hierarchical index of images to identify the cluster of images that is most feature similar to that feature of the target image. The image search system identifies the high-level cluster that is most feature similar to the target image and then the low-level cluster within that high-level cluster that is most feature similar to the target image. The images of identified low-level clusters are candidate images. In some embodiments, the image search system identifies the most similar high-level cluster as the cluster for high-order bits that are the same as the high-order bits of the hash code of the target image. The image search system identifies the most similar low-level cluster as that cluster with the minimum distance between the images of the cluster and the target image. After the candidate images are identified for each feature, the image search system may generate a weighted sum of the number of features for which a candidate image is feature similar to a feature of the target image. The features may be weighted to give a higher contribution to those features that are more indicative overall of image similarity. For example, a region of interest feature may be weighted twice a gray scale feature. The features can be weighted linearly or non-linearly. In addition, the weights of the features may be learned using machine learning techniques such as linear regression with training data.

FIG. 1 is a block diagram that illustrates components of an object search system in one embodiment. The object search system 110 may be adapted to various types of objects such as images, videos, audio, multimedia objects, and so on. The object search system is connected to web site servers 150 and user computing devices 160 via a communications link 140. The object search system may crawl the web sites to identify target objects and then identify objects similar to the target objects to detect copyright violations. The object search system may also receive target images from user computing devices as search requests, identify objects similar to the target object, and return the similar objects as search results. The object search system includes an object store 111 and a cluster data structure 112. The object store includes an entry for each object in the collection. Each entry may contain an identifier of the object and the object. The cluster data structure includes a hierarchical index of clusters for each of the features used by the object search system.

The object search system also includes a generate cluster data structure component 121, a generate cluster index data structure component 122, a generate high-level clusters component 123, a generate low-level clusters component 124, a calculate cluster distance component 125, and a merge nearest clusters component 126. The generate cluster data structure component generates for each feature the hierarchical index of clusters for the objects in the object store. The generate cluster index data structure component generates a clustered index for a feature. The generate cluster data structure component invokes the generate high-level clusters component and the generate low-level clusters component to generate the high-level and low-level clusters. The generate low-level clusters component invokes the calculate cluster distance component to determine the distance between low-level clusters and invokes the merge nearest clusters component to merge clusters.

The object search system also includes a search engine 131 and a find similar objects component 132. The search engine is provided with a target object and invokes the find similar objects component. The find similar objects component finds the most feature similar cluster to the target object for each feature. The find similar objects component then generates a similarity score for each of the candidate objects of the most feature similar clusters. The search engine may rank the candidate objects based on the similarity scores.

Figure 2:
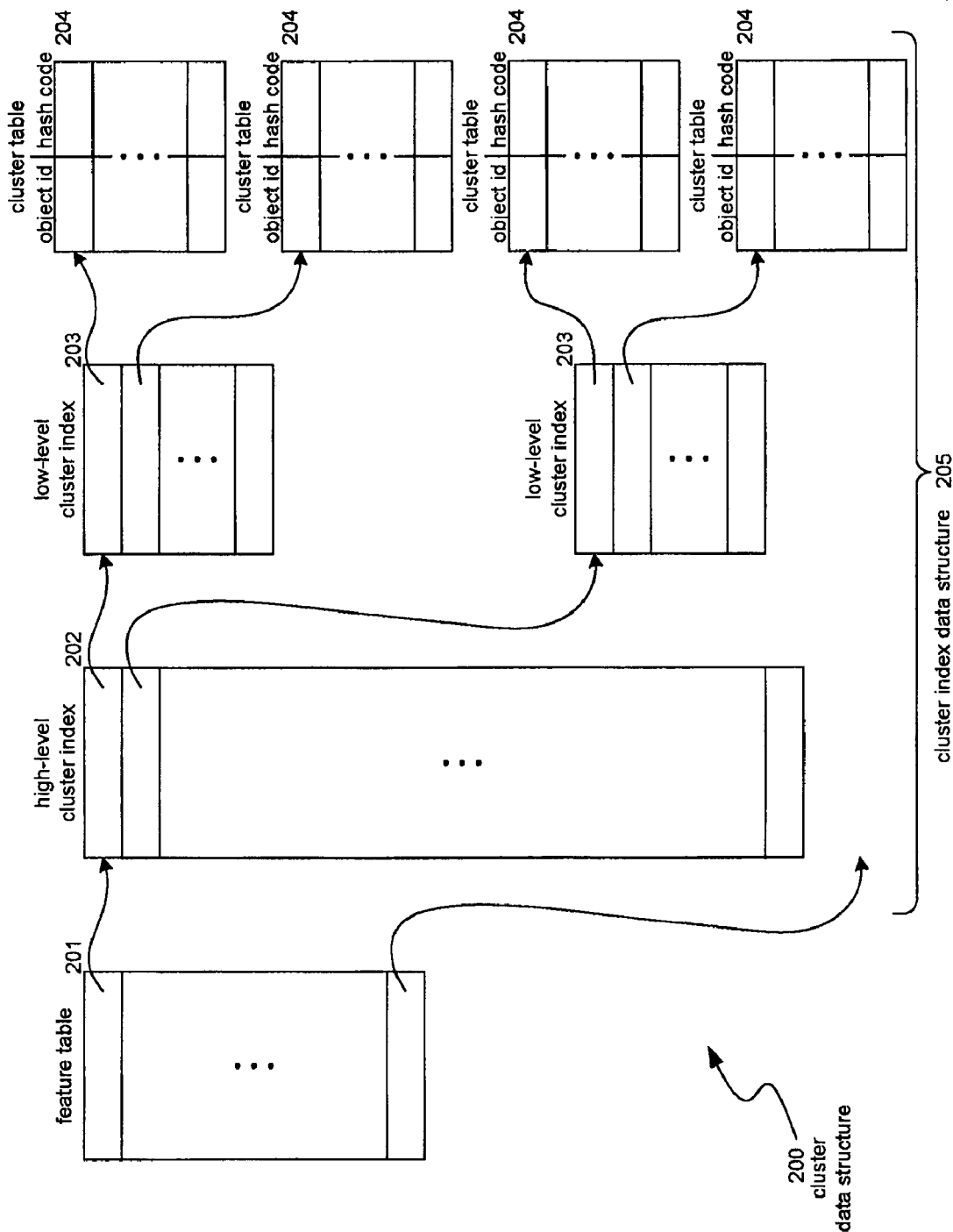
FIG. 2 is a block diagram that illustrates a logical organization of a cluster data structure of the object search system in one embodiment.

FIG. 2 is a block diagram that illustrates a logical organization of a cluster data structure of the object search system in one embodiment. The cluster data structure 200 includes a feature table 201. The feature table contains an entry for each feature (e.g., grayscale and color histogram) used by the object search system. The number of entries represents the dimensionality of the vector space. Each entry of the feature table contains a pointer to a high-level cluster index 202 for that feature. The high-level cluster index contains an entry for each high-level cluster. Each entry contains a reference to a low-level cluster index 203 for the high-level cluster. A low-level cluster index contains an entry for each low-level cluster. Each entry contains a reference to a cluster table 204 that contains an entry for each object within the cluster. Each entry of a cluster table contains an object identifier and the hash code for that feature for the object. The high-level cluster index, the low-level cluster indexes, and the cluster tables for a feature represent a cluster index data structure 205 for that feature. One skilled in the art will appreciate that many different types of data structures can be used to represent the hierarchical index, such as trees, linked lists, tables, and so on.

The computing device on which the image search system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the image search system may be implemented in or used in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The image search system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the search engine may be hosted on a separate computing system.

Figure 3:
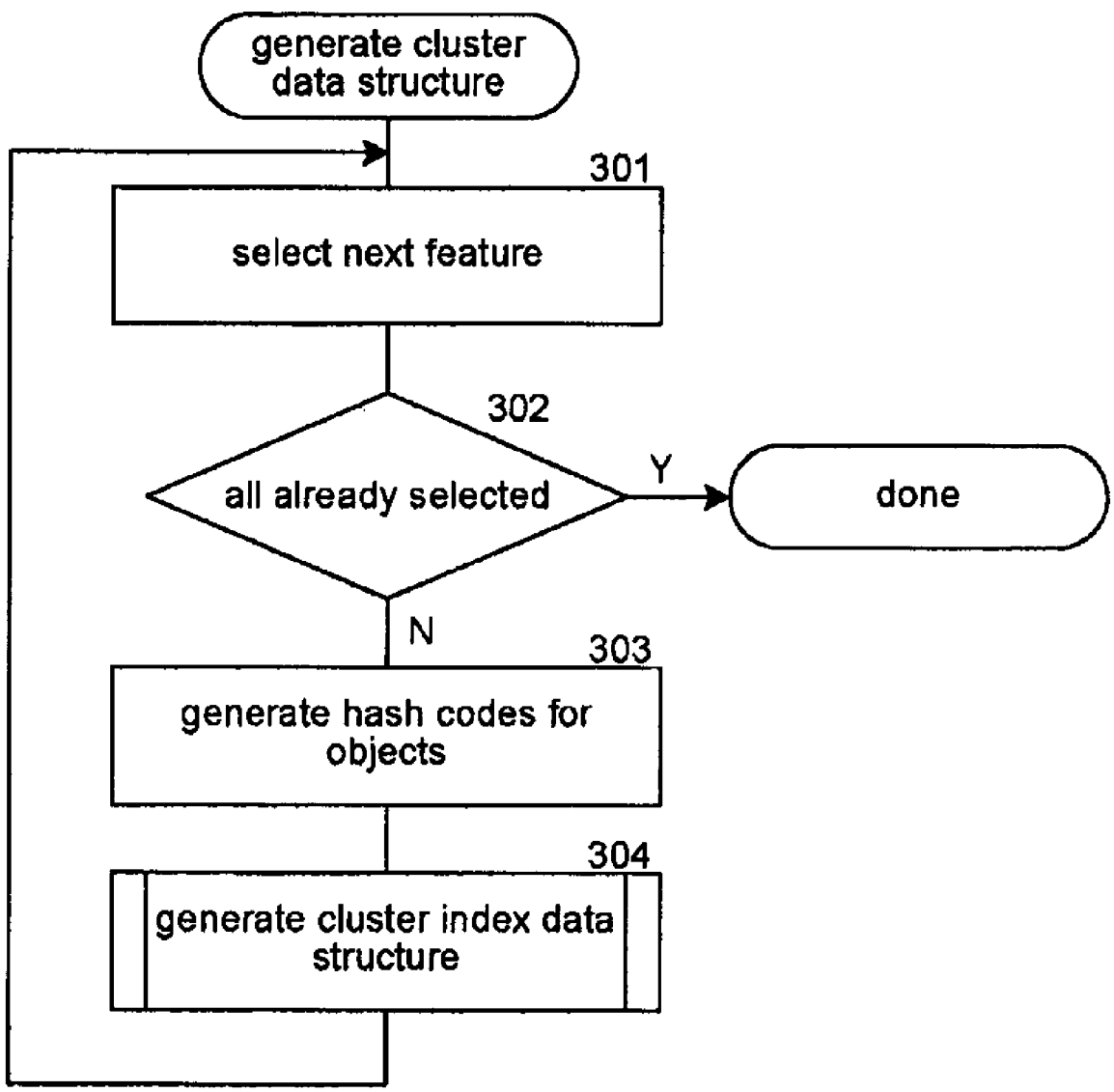
FIG. 3 is a flow diagram that illustrates the processing of the generate cluster data structure component of the object search system in one embodiment.

FIG. 3 is a flow diagram that illustrates the processing of the generate cluster data structure component of the object search system in one embodiment. The component is invoked to generate the cluster data structure for the objects of the object store. In block 301, the component selects the next feature used by the object search system. In decision block 302, if all the features have already been selected, then the component completes, else the component continues at block 303. In block 303, the component generates hash codes for the objects in the collection for the selected feature. In block 304, the component invokes the generate cluster index data structure component to generate the cluster index data structure for the selected feature. The component then loops to block 301 to select the next feature.

Figure 4:
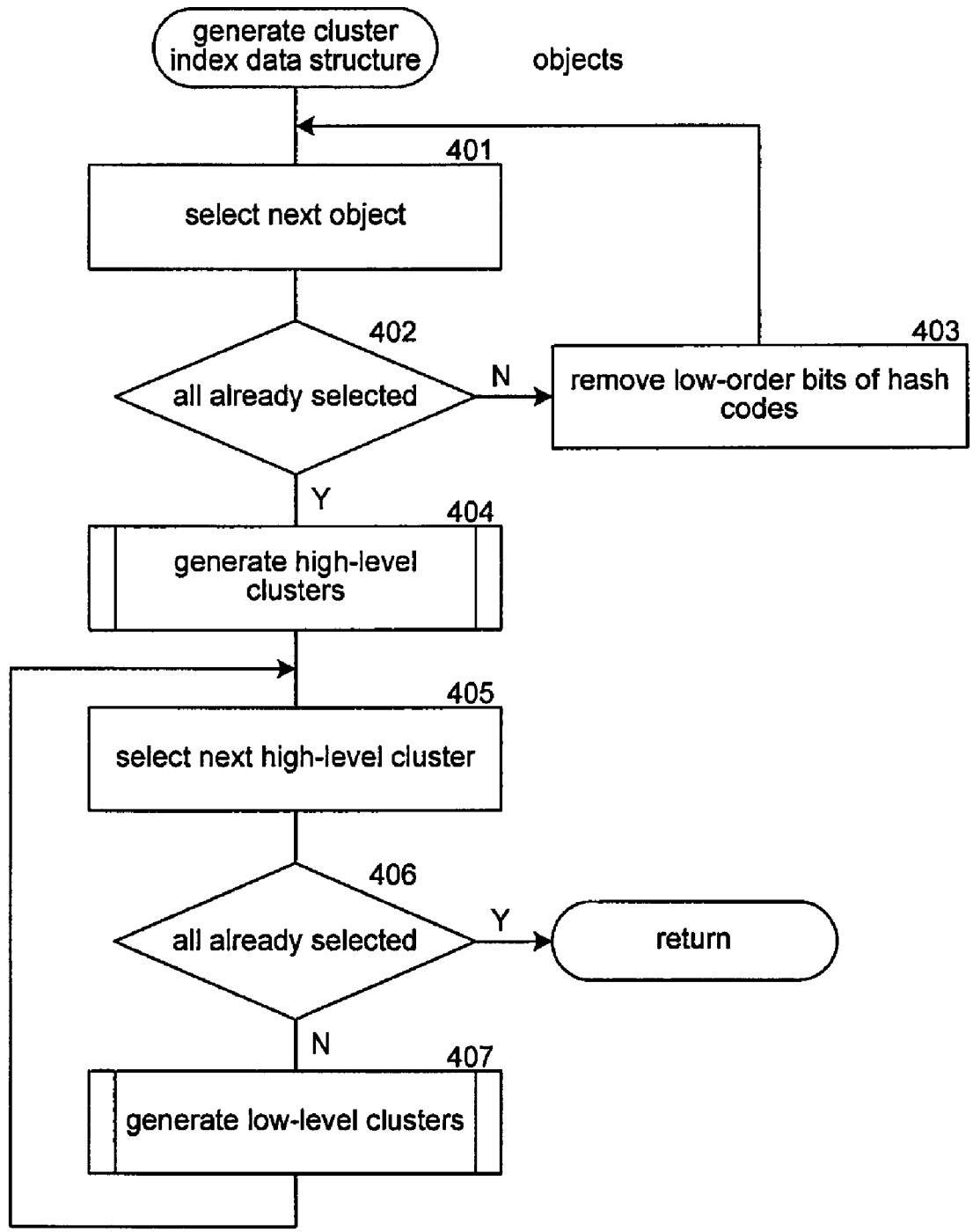
FIG. 4 is a flow diagram that illustrates the processing of the generate cluster index data structure component of the object search system in one embodiment.

FIG. 4 is a flow diagram that illustrates the processing of the generate cluster index data structure component of the object search system in one embodiment. The component is passed hash codes of a feature of the objects to be clustered. The component generates the cluster index data structure for that feature for the objects. In blocks 401-403, the component loops removing low-order bits of each hash code. The removal of the low-order bits means that all objects with the same remaining bits will be in the same cluster. The number of low-order bits to remove may be a parameter that can be set based on the type of object, the size of the hash code, and so on. In block 401, the component selects the next object. In decision block 402, if all the objects have already been selected, then the component continues at block 404, else the component continues at block 403. In block 403, the component removes the low-order bits of the hash code of the selected object and then loops to block 401 to select the next object. In block 404, the component invokes the generate high-level clusters component. In blocks 405-407, the component loops generating the low-level clusters for each high-level cluster. In block 405, the component selects the next high-level cluster. In decision block 406, if all the high-level clusters have already been selected, then the component returns, else the component continues at block 407. In block 407, the component invokes the generate low-level clusters component to generate the low-level clusters for the selected high-level cluster. The component then loops to block 405 to select the next high-level cluster.

Figure 5:
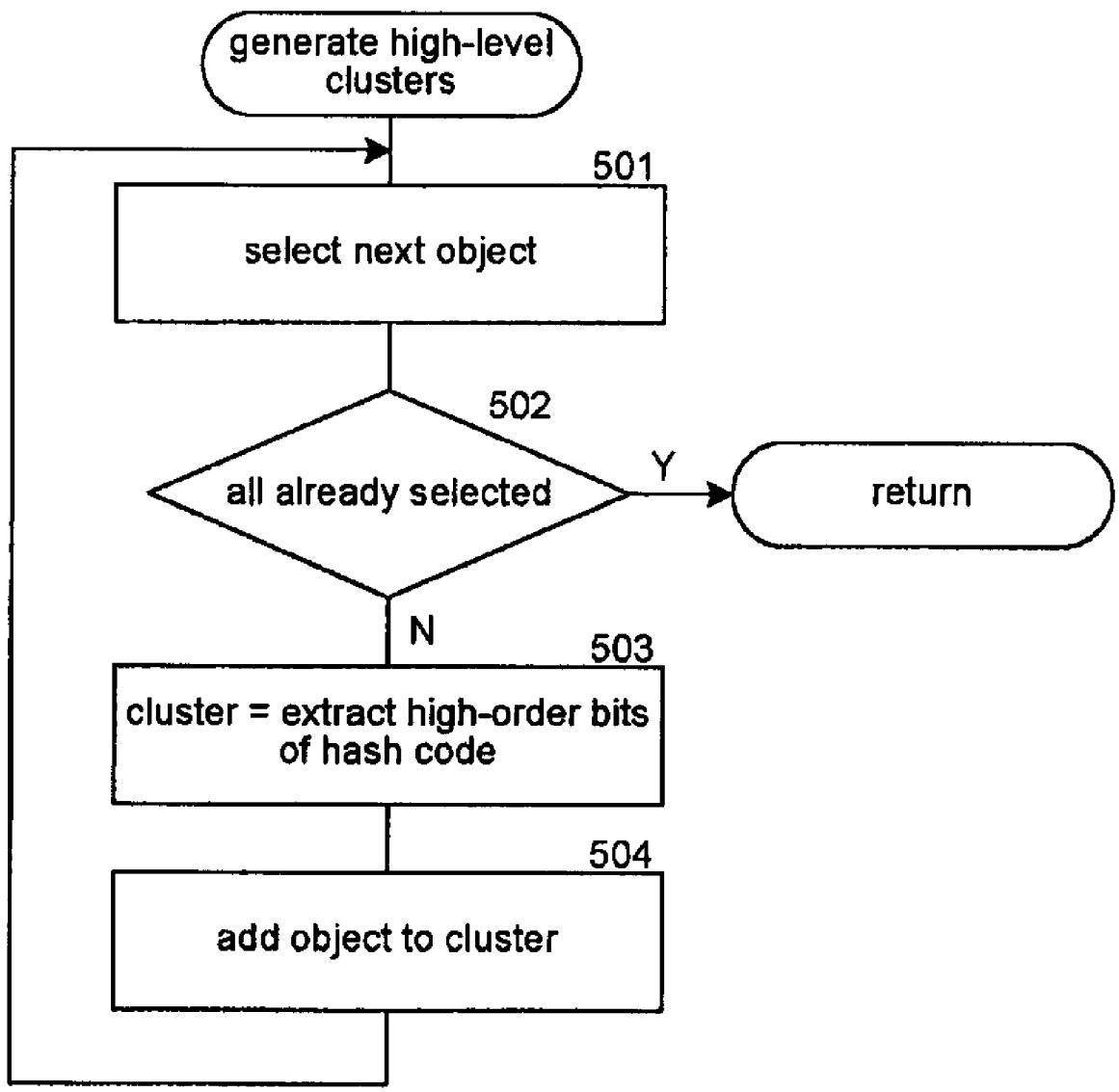
FIG. 5 is a flow diagram that illustrates the processing of the generate high-level clusters component of the object search system in one embodiment.

FIG. 5 is a flow diagram that illustrates the processing of the generate high-level clusters component of the object search system in one embodiment. The component is passed the object identifiers and the corresponding hash codes and generates the corresponding high-level clusters. In blocks 501-504, the component loops generating the high-level clusters. In block 501, the component selects the next object. In decision block 502, if all the objects have already been selected, then the component returns, else the component continues at block 503. In block 503, the component identifies the high-level cluster as corresponding to the high-order bits of the hash code of the selected object. In block 504, the component adds the selected object to the identified cluster and then loops to block 501 to select the next object.

Figure 6:
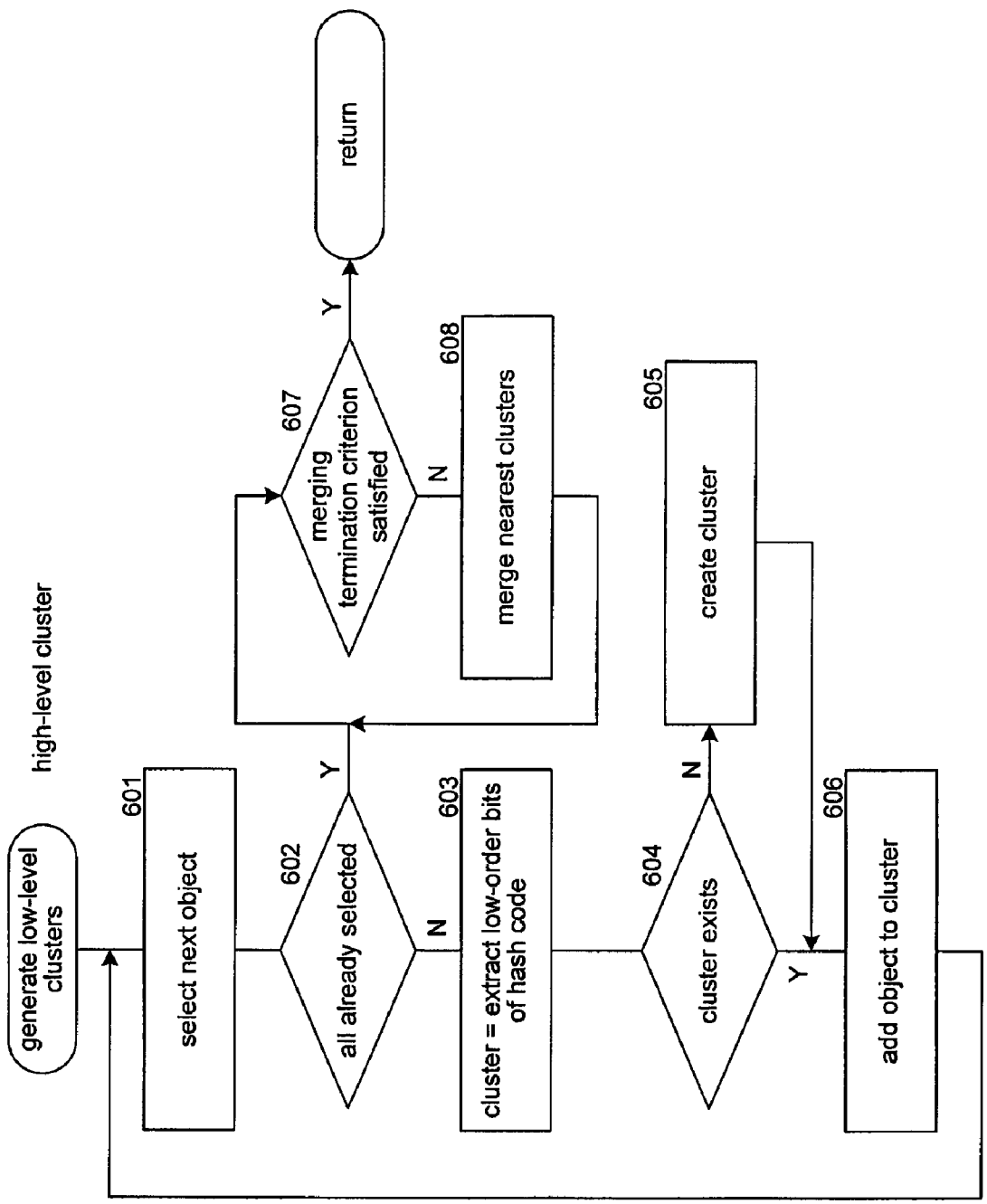
FIG. 6 is a flow diagram that illustrates the processing of the generate low-level clusters component of the object search system in one embodiment.

FIG. 6 is a flow diagram that illustrates the processing of the generate low-level clusters component of the object search system in one embodiment. The component is passed an indication of a high-level cluster and generates the corresponding low-level clusters. In blocks 601-606, the component loops generating the initial low-level clusters. In block 601, the component selects the next object of the high-level cluster. In decision block 602, if all the objects have already been selected, then the component continues at block 607, else the component continues at block 603. In block 603, the component identifies the low-level cluster as corresponding to the low-order bits of the hash code of the selected object. In decision block 604, if the cluster exists, then the component continues at block 606, else the component continues at block 605. In block 605, the component creates the cluster for those low-order bits. In block 606, the component adds the object to the cluster and then loops to block 601 to select the next object. In blocks 607-608, the component loops merging the low-level clusters until a merging termination criterion is satisfied. In decision block 607, if the merging termination criterion is satisfied, then the component returns, else the component continues at block 608. In block 608, the component invokes the merge nearest clusters component to merge the most similar clusters and then loops to block 607 to check the termination criterion.

Figure 7:
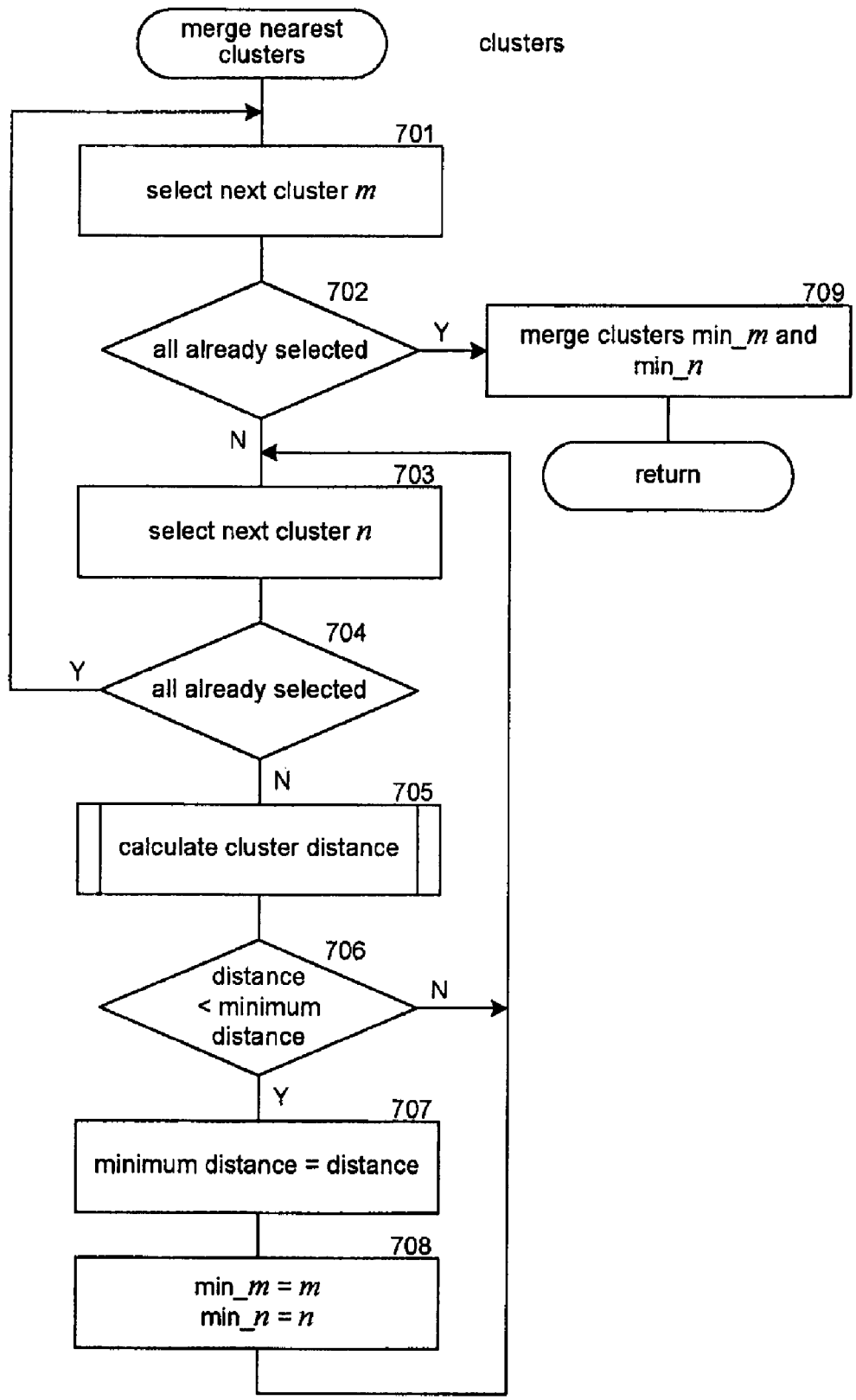
FIG. 7 is a flow diagram that illustrates the processing of the merge nearest clusters component of the object search system in one embodiment.

FIG. 7 is a flow diagram that illustrates the processing of the merge nearest clusters component of the object search system in one embodiment. The component is passed the low-level clusters and merges the nearest clusters. In block 701, the component selects the next low-level cluster m. In decision block 702, if all the low-level clusters m have already been selected, then the component continues at block 709, else the component continues at block 703. In block 703, the component selects the next cluster n for which the distance between cluster m and cluster n has not yet been calculated. In decision block 704, if all such clusters have already been selected, then the component loops to block 701 to select the next cluster m, else the component continues at block 705. In block 705, the component invokes the calculate cluster distance component to calculate the distance between the selected clusters. In decision block 706, if the distance is less than the minimum distance encountered so far, then the component continues at block 707, else the component loops to block 703 to select the next cluster n. In block 707, the component sets the minimum distance to the calculated distance. In block 708, the component records the selected clusters m and n and then loops to block 703 to select the next cluster n. In block 709, the component merges the clusters with the minimum distance and then returns.

Figure 8:
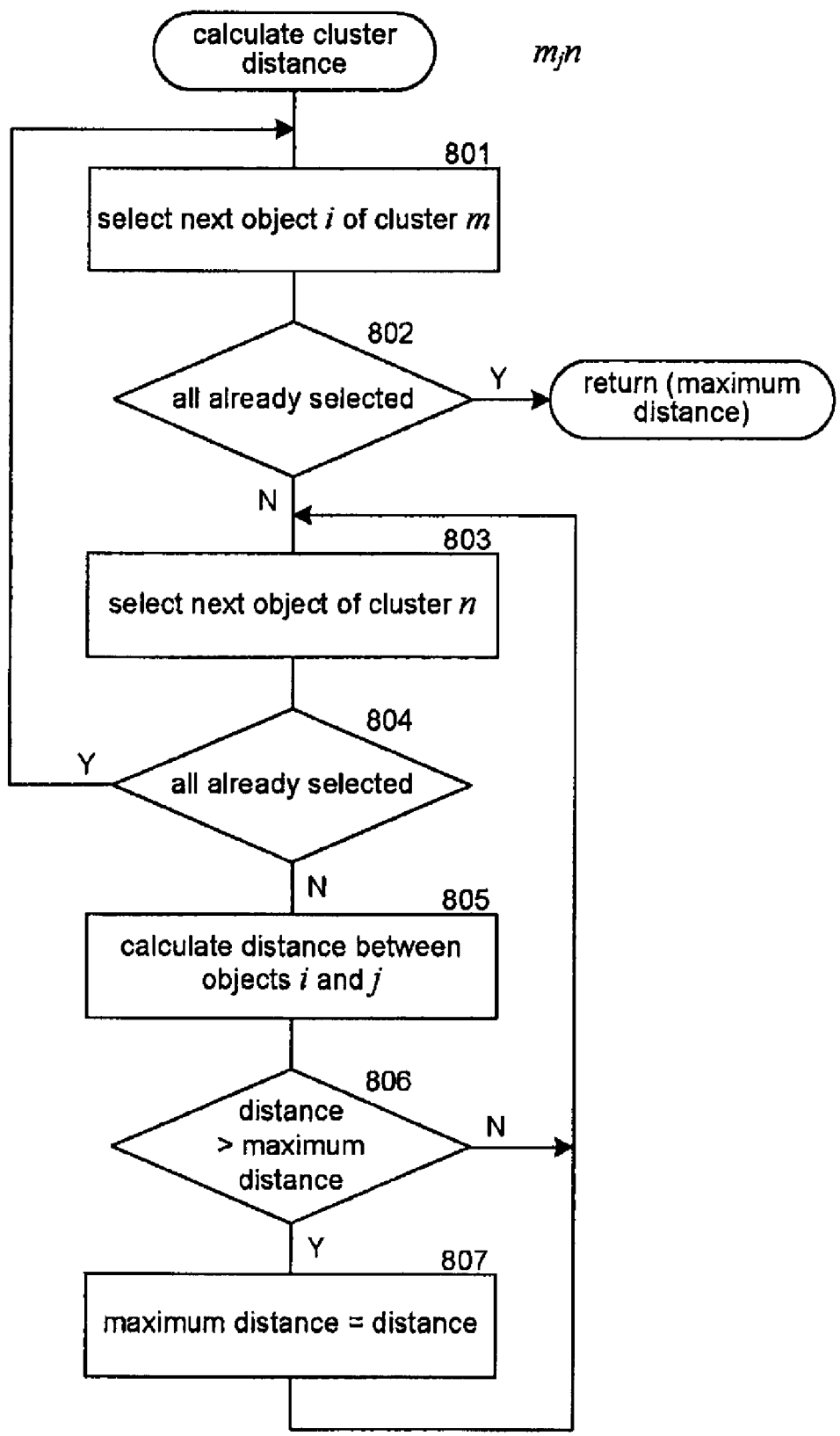
FIG. 8 is a flow diagram that illustrates the processing of the calculate cluster distance component of the object search system in one embodiment.

FIG. 8 is a flow diagram that illustrates the processing of the calculate cluster distance component of the object search system in one embodiment. The component is passed the identifiers of two clusters m and n and returns the distance between the clusters. In block 801, the component selects the next object i of cluster m. In decision block 802, if all the objects of cluster m have already been selected, then the component returns the maximum distance, else the component continues at block 803. In block 803, the component selects the next object j of cluster n. In decision block 804, if all the objects j of cluster n have already been selected, then the component loops to block 801 to select the next object i of cluster m, else the component continues at block 805. In block 805, the component calculates the distance between objects i and j. In decision block 806, if the calculated distance is greater than the maximum distance calculated so far, then the component continues at block 807, else the component loops to block 803 to select the next object j of cluster n. In block 807, the component sets the maximum distance to the calculated distance and then loops to block 803 to select the next object j of cluster n. One skilled in the art will appreciate that distance can be calculated in many different ways. For example, the hash code can represent an integer and distance can be calculated by subtraction. Also, the objects of a cluster can be represented by an average hash code, a centroid hash code, and so on. In such a case, the distance between clusters can be calculated based on such a representative hash code.

Figure 9:
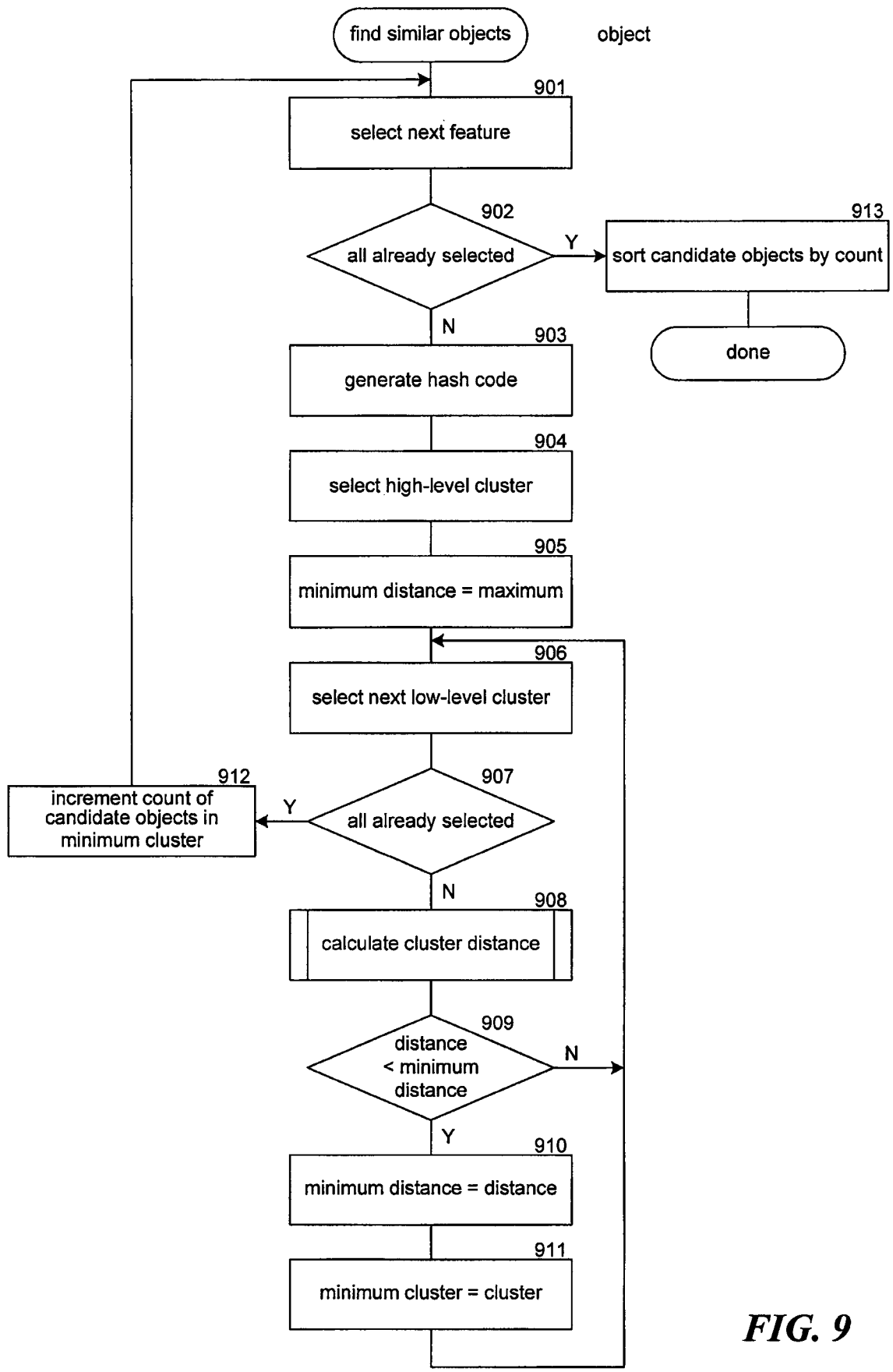
FIG. 9 is a flow diagram that illustrates the processing of the find similar objects component of the object search system in one embodiment.

FIG. 9 is a flow diagram that illustrates the processing of the find similar objects component of the object search system in one embodiment. The component is passed a target object and identifies and ranks similar objects. In blocks 901-912, the component loops identifying candidate objects and a count of features for which the candidate object is feature similar to the target object. In block 901, the component selects the next feature. In decision block 902, if all the features have already been selected, then the component continues at block 913, else the component continues at block 903. In block 903, the component generates the hash code for the target object for the selected feature. In block 904, the component selects the high-level cluster based on the high-order bits of the hash code of the target object. In block 905, the component initializes the minimum distance to a maximum value. In blocks 906-911, the component loops identifying the cluster that is nearest to the target object. In block 906, the component selects the next low-level cluster for the selected high-level cluster. In decision block 907, if all the low-level clusters have already been selected, then the component continues at block 912, else the component continues at block 908. In block 908, the component invokes the calculate cluster distance component to calculate the distance between the selected low-level cluster and a cluster that contains only the target object. In decision block 909, if the calculated distance is less than the minimum distance encountered so far, then the component continues at block 910, else the component loops to block 906 to select the next low-level cluster. In block 910, the component sets the minimum distance to the calculated distance. In block 911, the component records the cluster identifier corresponding to the low-level cluster with the minimum distance. The component then loops to block 906 to select the next low-level cluster. In block 912, the component increments a weighted count of the candidate objects in the minimum cluster. The component then loops to block 901 to select the next feature. In block 913, the component sorts the candidate objects by the weighted count and then completes.

Figure 10:
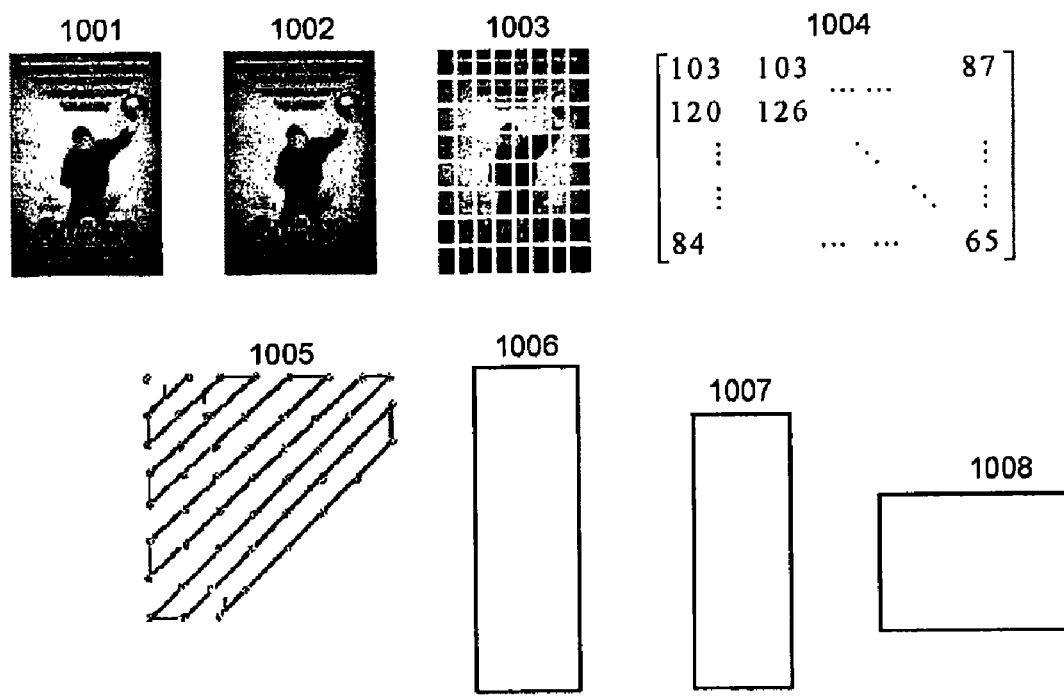
FIG. 10 is a diagram that illustrates the generating of a hash code for a gray scale feature of an image in one embodiment.

FIG. 10 is a diagram that illustrates the generating of a hash code for a gray scale feature of an image in one embodiment. Image 1001 represents the image for which the hash code is to be generated. Initially, the image search system converts the image to a gray level image as represented by image 1002. The system then divides the image into blocks (e.g., 8-by-8 blocks) as illustrated by image 1003. The system then calculates the average intensity of each block to generate matrix 1004 as indicated by the following:

$$I_{ij} = \frac{\sum_{x=0}^{w-1}\sum_{y=0}^{h-1}\text{Int}(x, y)}{w \cdot h}, i = 0, \ldots 6, 7, j = 0, \ldots 6, 7 \quad (1)$$

where $I_{ij}$ is the average intensity for block ij and x and y represent the pixels of block ij. The system then performs a two-dimensional discrete cosine transform ("DCT") on the matrix. The system discards the DC coefficient of the DCT matrix and selects 108 AC coefficients of the DCT matrix in a zigzag pattern as illustrated by pattern 1005 resulting in an AC coefficients vector 1006. The system then performs a principal component analysis ("PCA") to generate a 32-dimension feature vector 1007 as illustrated by the following:

$$Y_n = P^T A_m \quad (2)$$

where $Y_n$ represents the 32-dimension feature vector, $A_m$ represents the 108 AC coefficients, and P represents an m×n transform matrix whose columns are the n orthonormal eigenvectors corresponding to the first n largest eigenvalues of the covariance matrix and $\Sigma_{A_m}$, and $P^T P = I_n$. The system may train the transform matrix using a collection of sample images. Finally, the system generates a 32-bit hash value 1008 from the 32-dimension feature vector by setting the value of each of the 32 bits to 1 if the corresponding 32-dimension feature vector is greater than 0, and to 0 otherwise. One skilled in the art will appreciate that many different algorithms may be used to generate a hash code for a feature of an image.

Figure 11:
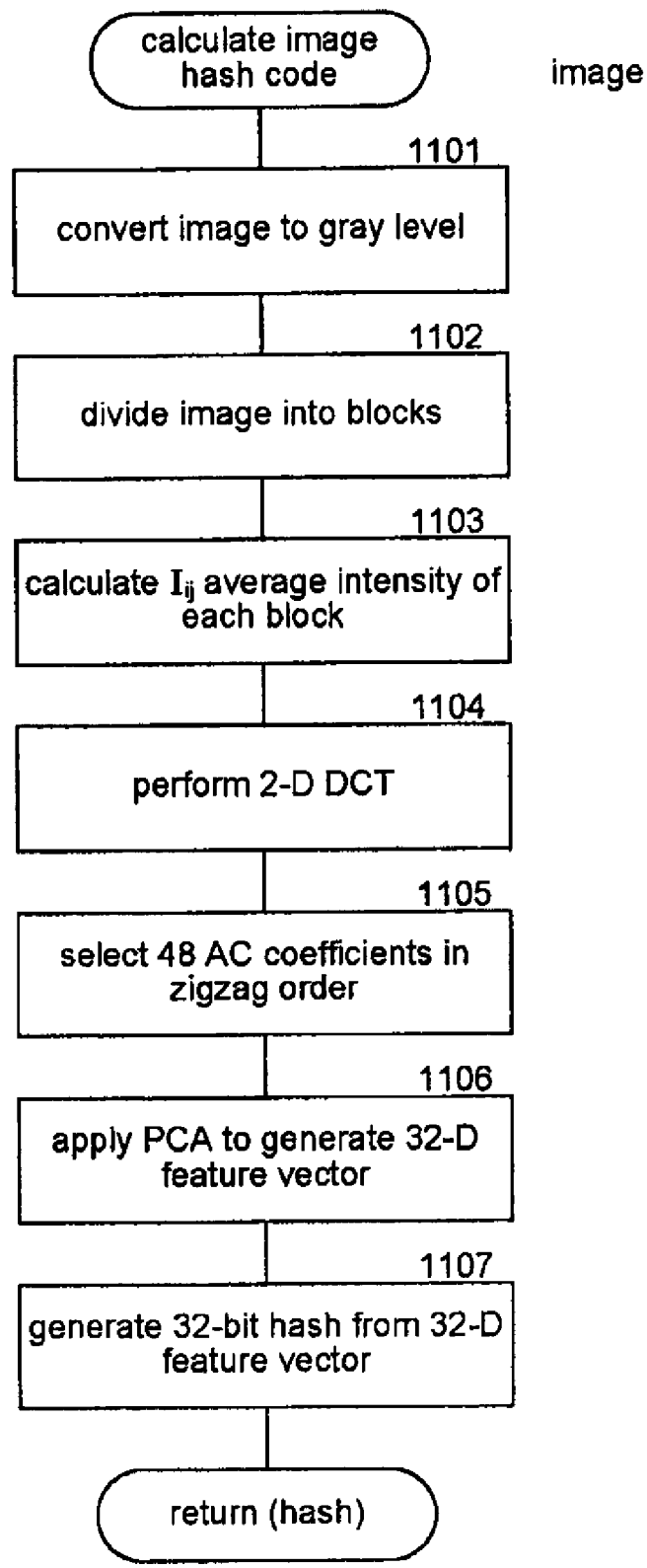
FIG. 11 is a flow diagram that illustrates the processing of the calculate image hash code component in one embodiment.

FIG. 11 is a flow diagram that illustrates the processing of the calculate image hash code component in one embodiment. The component is passed an image and generates a hash code for a gray scale feature for the image. In block 1101, the component converts the image into a gray level image. In block 1102, the component divides the image into blocks. In block 1103, the component calculates the average intensity of each block to generate an intensity matrix. In block 1104, the component performs a two-dimensional DCT on the intensity matrix. In block 1105, the component extracts 48 AC coefficients from the DCT matrix. In block 1105, the component performs a PCA to generate a 32-dimension feature vector from the 48 AC coefficients. In block 1107, the component generates a 32-bit hash code from the 32-dimension feature vector and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the object search system may find similar objects by identifying candidate images and treating the features of each candidate image as a document for that candidate image. The features thus represent keywords of the documents. The image search system can then use a conventional text-based similarity algorithm to assess the similarity of the candidate objects to the target object. The system may use different types of features for different types of images (e.g., portraits and landscape images). Accordingly, the invention is not limited except as by the appended claims.

We claim:

1. A computer-readable storage device storing computer-executable instructions for controlling a computing device to identify images of a collection that are similar to a target image, by a method comprising:
for each of a plurality of features, providing a cluster index data structure for the collection of images, the cluster index data structure defining clusters of images that are feature similar based on the values of that feature, such that for each feature, the images in the collection are clustered differently based on the values for that feature;
for each of the plurality of features, identifying, from the cluster index data structure for that feature, candidate images that are feature similar to the target image based on that feature, the cluster index data structure defining, for each the plurality of features of images, clusters of images that are feature similar based on that feature; and
for each of the candidate images, indicating similarity of that candidate image to the target image based on the features for which that candidate image is feature similar to the target image.

2. The computer-readable storage device of claim 1 wherein the cluster index data structure for a feature stores, for each image in the collection, a hash code representing the feature for that image, and wherein images are clustered that are feature similar using the hash code to represent the feature of an image.

3. The computer-readable storage device of claim 1 wherein the target image is provided in a search request and including ranking the candidate images based on the indicated similarity of the images.

4. The computer-readable storage device of claim 1 wherein each feature representing a characteristic of the image.

5. The computer-readable storage device of claim 1 wherein the candidate image is feature similar to the target object based on the values of the features.

6. The computer-readable storage device of claim 1 wherein the candidate image is feature similar to the target object based on the number of identified clusters containing the candidate object.

7. A method performed by a computing device with a processor and a memory for identifying objects of a collection that are similar to a target object, the method comprising:
for each of a plurality of features, identifying, from a cluster index data structure for that feature, candidate objects that are feature similar to the target object based on that feature, the cluster index data structure defining, for each of the plurality of features of objects, clusters of objects that are feature similar based on that feature, wherein each cluster index data structure provides a separate clustering of the objects in the collection based on a different feature; and for candidate objects, indicating by the processor similarity of the candidate object to the target object based on the features for which the candidate object is feature similar to the target object.

8. The method of claim 7 wherein the cluster index data structure for a feature stores, for each object in the collection, a hash code representing the feature for that object, and wherein objects are clustered that are feature similar using the hash code to represent the feature of an object.

9. The method of claim 8 includes generating the cluster index data structure.

10. The method of claim 7 wherein the target object is provided in a search request and including ranking the candidate objects based on the indicated similarity of the objects.

11. The method of claim 7 wherein each feature represents a characteristic of the object.

12. The method of claim 7 including generating, for each feature, a cluster index data structure for the collection of objects, the cluster index data structure defining clusters of objects that are feature similar based on the values of feature, such that for each feature, the objects in the collection are clustered differently based on the values for that feature.

13. A computing device for identifying images of a collection that are similar to a target image, the computing device comprising:

a memory storing computer-executable instructions of:

a component that, for each of a plurality of features, identifies, from a cluster index data structure for that one feature, candidate images that are feature similar to the target image based on that one feature, wherein images are feature similar to the target image based on that one feature when the images have similar values for that one feature; and a component that, for each of the candidate images, indicates similarity of that candidate image to the target image based on the features for which that candidate image is feature similar to the target image wherein each of the plurality of cluster index data structures provides a mapping of values for one feature to clusters of images that have similar values for that one feature; and a processor that executes the computer-executable instructions stored in the memory.

14. The computing device of claim 13 wherein the cluster index data structure for a feature stores, for each object in the collection, a hash code representing that feature for that object, and wherein objects are clustered that are feature similar using the hash code to represent the feature of an object.

15. The computing device of claim 14 wherein feature similarity for a feature is based on a Hamming distance between hash codes of that feature.

16. The computing device of claim 13 includes a component that generates the cluster index data structure for each of the plurality of features.

17. The computing device of claim 13 wherein the target object is provided in a search request and including a component that ranks the candidate objects based on the indicated similarity of the objects.

18. The computing device of claim 13 wherein each feature represents a characteristic of the object.

* * * * *